US012447096B1

(12) United States Patent
Zhou

(10) Patent No.: US 12,447,096 B1
(45) Date of Patent: Oct. 21, 2025

(54) MASSAGE ROLLER

(71) Applicant: Guangdong Transcontinental Technology Co., Ltd., Guangzhou (CN)

(72) Inventor: Hong Zhou, Guangdong (CN)

(73) Assignee: GUANGDONG TRANSCONTINENTAL TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 19/022,141

(22) Filed: Jan. 15, 2025

(30) Foreign Application Priority Data

Jan. 7, 2025 (CN) ........................ 202520036860.4

(51) Int. Cl.
*A61H 15/00* (2006.01)

(52) U.S. Cl.
CPC . *A61H 15/0092* (2013.01); *A61H 2015/0014* (2013.01); *A61H 2201/1695* (2013.01)

(58) Field of Classification Search
CPC ................ A61H 15/00; A61H 15/0092; A61H 2015/0014; A61H 2015/0021; A61H 2201/169; A61H 2201/1692; A61H 2201/1695
USPC ................................................ D24/211–215
See application file for complete search history.

(56) References Cited

U.S. PATENT DOCUMENTS

| | | | | |
|---|---|---|---|---|
| 6,419,650 | B1 * | 7/2002 | Ryan | A61H 39/04 601/19 |
| 9,005,146 | B2 * | 4/2015 | Phillips | A61H 15/00 601/19 |
| D788,313 | S * | 5/2017 | Lawrie | D24/211 |
| 10,307,325 | B1 * | 6/2019 | Johnson | A61H 1/00 |
| D919,107 | S * | 5/2021 | Huang | D24/211 |
| D1,024,232 | S * | 4/2024 | Yu | D21/688 |
| 2012/0035029 | A1 * | 2/2012 | Dye | B29C 45/00 482/132 |
| 2016/0331628 | A1 * | 11/2016 | Kuo | A61H 7/007 |
| 2017/0007495 | A1 * | 1/2017 | Norwood | A61H 15/0092 |
| 2019/0060160 | A1 * | 2/2019 | Krichevsky | A61H 15/0092 |
| 2019/0125621 | A1 * | 5/2019 | Kyriacou | A61H 15/00 |

FOREIGN PATENT DOCUMENTS

| | | | |
|---|---|---|---|
| CN | 114225321 A * | 3/2022 | A61H 15/0092 |

* cited by examiner

*Primary Examiner* — Colin W Stuart
*Assistant Examiner* — Douglas Y Sul

(57) ABSTRACT

A massage roller includes a polygonal main body and a protruding massage part. The protruding massage part is connected to the polygonal main body, and the protruding massage part is arranged around a circumference of the polygonal main body. Due to the arrangement of the protruding massage part around the circumference of the polygonal main body, the polygonal main body is capable of continuously massaging and relaxing a user's body parts while rolling.

18 Claims, 8 Drawing Sheets

MASSAGE ROLLER

CROSS-REFERENCE TO RELATED APPLICATIONS

The application claims priority of Chinese patent application CN202520036860.4, filed on Jan. 7, 2025, which is incorporated herein by reference in its entireties.

TECHNICAL FIELD

The present invention relates to the field of massage equipment, particularly to a massage roller.

BACKGROUND ART

Many athletes, coaches, therapists, and others involved in fitness and training recognize the use of various types of massage equipment and techniques for relieving muscular fasciae and other benefits. These benefits include improving balance and posture, reducing chronic pain, increasing flexibility, expanding range of motion, enhancing overall health, and reducing stress.

Anadesma is a dense connective tissue that surrounds muscles, bones, joints, and other parts of the body. This tissue can become inflamed, thickened, hardened, and knotted, causing pain in areas called the “trigger points”. Many therapists and trainers recommend using muscular fasciae release massage to treat these areas of trigger points, including self massage exercises.

Traditionally, there are various self exercises that individuals can engage in without the presence or assistance of a waiter or masseur. A massage roller can be used in various ways, for example, by placing the massage roller against a part of a user’s body, blood flow and tissue flexibility can be improved. However, the effects are often limited and relatively superficial, and these types of rollers cannot provide the deeper and more thorough massage effects required to achieve effective muscular fasciae release.

SUMMARY

In order to overcome the shortcomings of the prior art, a massage roller is provided in the present invention. The massage roller includes:

- a polygonal main body; and
- a protruding massage part, wherein the protruding massage part is connected to the polygonal main body, and the protruding massage part is arranged around a circumference of the polygonal main body.

As an improvement of the present invention, the polygonal main body is a solid polygonal main body.

As an improvement of the present invention, the polygonal main body is a hollow polygonal main body.

As an improvement of the present invention, the polygonal main body includes an inner core and a cover layer. The cover layer covers a surface of the inner core, and the protruding massage part is connected to the cover layer.

As an improvement of the present invention, the inner core is a polygonal inner core, and the cover layer is a polygonal cover layer.

As an improvement of the present invention, the inner core and the cover layer are made of different materials.

As an improvement of the present invention, the cover layer is a flexible cover layer.

As an improvement of the present invention, a hardness of the cover layer is less than a hardness of the inner core.

As an improvement of the present invention, the cover layer is a denim cover layer, a coral fleece cover layer, a plastic cover layer, a silicone cover layer, or a rubber cover layer. The inner core is a plastic inner core, a metal inner core, a bamboo inner core, or a wood inner core.

As an improvement of the present invention, the inner core is a hollow inner core.

As an improvement of the present invention, the cover layer is provided with a cavity, a first end, and a second end. The first end and the second end are each provided with a first opening. The first opening is in communication with the cavity. An inner wall of the first opening extends to form a protruding first stop edge. The inner core is positioned inside the cavity, and the first stop edge stops the inner core inside the cavity.

As an improvement of the present invention, a height of the first stop edge is greater than or equal to a thickness of the inner core.

As an improvement of the present invention, the protruding massage part includes a plurality of first protruding parts and a plurality of second protruding parts. A shape of the first protruding part is different from a shape of the second protruding part. The first protruding parts and the second protruding parts are alternately arranged along the circumference of the polygonal main body.

As an improvement of the present invention, a height of the second protruding part is less than a height of the first protruding part. A width of the second protruding part is less than a width of the first protruding part. A length of the second protruding part is less than a length of the first protruding part.

As an improvement of the present invention, the first protruding part includes a plurality of first protruding blocks. The plurality of first protruding blocks are distributed in a wave shape along an axial direction of the polygonal main body. The second protruding part includes a plurality of second protruding blocks. The plurality of second protruding blocks are distributed in a wave shape along the axial direction of the polygonal main body.

As an improvement of the present invention, the polygonal main body includes a plurality of connecting side walls. The plurality of connecting side walls are connected to each other. The plurality of connecting side walls each have a flat first outer surface. Connections of the plurality of connecting side walls are provided with connecting edges. The plurality of first protruding blocks are arranged along the first outer surfaces. The plurality of second protruding blocks are arranged along the connecting edges.

As an improvement of the present invention, the plurality of first protruding blocks include first protruding block units, second protruding block units, and third protruding block units. A length of the first protruding block unit is greater than a length of the second protruding block unit, and the length of the second protruding block unit is greater than a length of the third protruding block unit. The first protruding block includes two of the first protruding block units, and the two first protruding block units are symmetrically arranged with each other. The first protruding block includes two of the second protruding block units, and the two second protruding block units are symmetrically arranged with each other. The first protruding block includes two of the third protruding block units, and the two third protruding block units are symmetrically arranged with each other.

As an improvement of the present invention, the polygonal main body is a triangular main body, a quadrilateral main body, a pentagonal main body, a hexagonal main body, a heptagonal main body, an octagonal main body, or a nonagonal main body.

As an improvement of the present invention, a length range of the polygonal main body is 5 CM-200 CM, a length range of the protruding massage part is 0.1 CM-100 CM, and a height range of the protruding massage part is 0.1 CM-5 CM.

As an improvement of the present invention, a thickness range of the inner core is 0.1 CM-100 CM, and a thickness range of the cover layer is 0.1 CM-15 CM.

As an improvement of the present invention, the length range of the polygonal main body is 15 CM-100 CM, the length range of the protruding massage part is 0.5 CM-45 CM, and the height range of the protruding massage part is 0.5 CM-2 CM.

As an improvement of the present invention, the thickness range of the inner core is 0.1 CM-6 CM, and the thickness range of the cover layer is 0.3 CM-10 CM.

As an improvement of the present invention, a lower edge of the first protruding block is an arc-shaped lower edge, and an upper edge of the first protruding block is an arc-shaped upper edge.

As an improvement of the present invention, the first protruding block is a long strip-shaped first protruding block.

As an improvement of the present invention, the second protruding block is a circular second protruding block.

As an improvement of the present invention, the first protruding block unit, the second protruding block unit, and the third protruding block unit have an identical width.

As an improvement of the present invention, the plurality of second protruding blocks have an identical shape.

As an improvement of the present invention, the plurality of first protruding blocks are distributed in a wave shape along the first outer surfaces. The plurality of second protruding blocks are distributed in a wave shape along the connecting edges.

As an improvement of the present invention, an upper end of the first protruding block is narrower than a lower end of the first protruding block, and an upper end of the second protruding block is narrower than a lower end of the second protruding block.

As an improvement of the present invention, the protruding massage part covers at least 1/10 of a surface area of the polygonal main body.

As an improvement of the present invention, a ratio of a length of the polygonal main body to a width of the polygonal main body is at least 1.1:1. A ratio of the length of the polygonal main body to a height of the polygonal main body is at least 1.1:1.

As an improvement of the present invention, the height of the polygonal main body is greater than a height of the protruding massage part.

As an improvement of the present invention, a ratio of the height of the polygonal main body to the height of the protruding massage part is at least 1.1:1.

As an improvement of the present invention, a ratio of the height of the first protruding part to the height of the second protruding part is at least 1.1:1.

As an improvement of the present invention, a ratio of the length of the first protruding block to the width of the first protruding block is at least 1.1:1.

Beneficial effects of the present invention are as follows. The massage roller is provided in the present invention, including the polygonal main body and the protruding massage part. The protruding massage part is connected to the polygonal main body, and the protruding massage part is arranged around the circumference of the polygonal main body. Since the protruding massage part is arranged around the circumference of the polygonal main body, the polygonal main body can continuously massage and relax a user's body parts while rolling. Moreover, since the main body is the polygonal main body, the rolling of the polygonal main body is made more rhythmic and stable. Furthermore, since the main body is the polygonal main body, it is convenient for the user to calculate a total number of rolling to accurately massage various parts of the body, preventing excessive or insufficient massage on the body parts.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
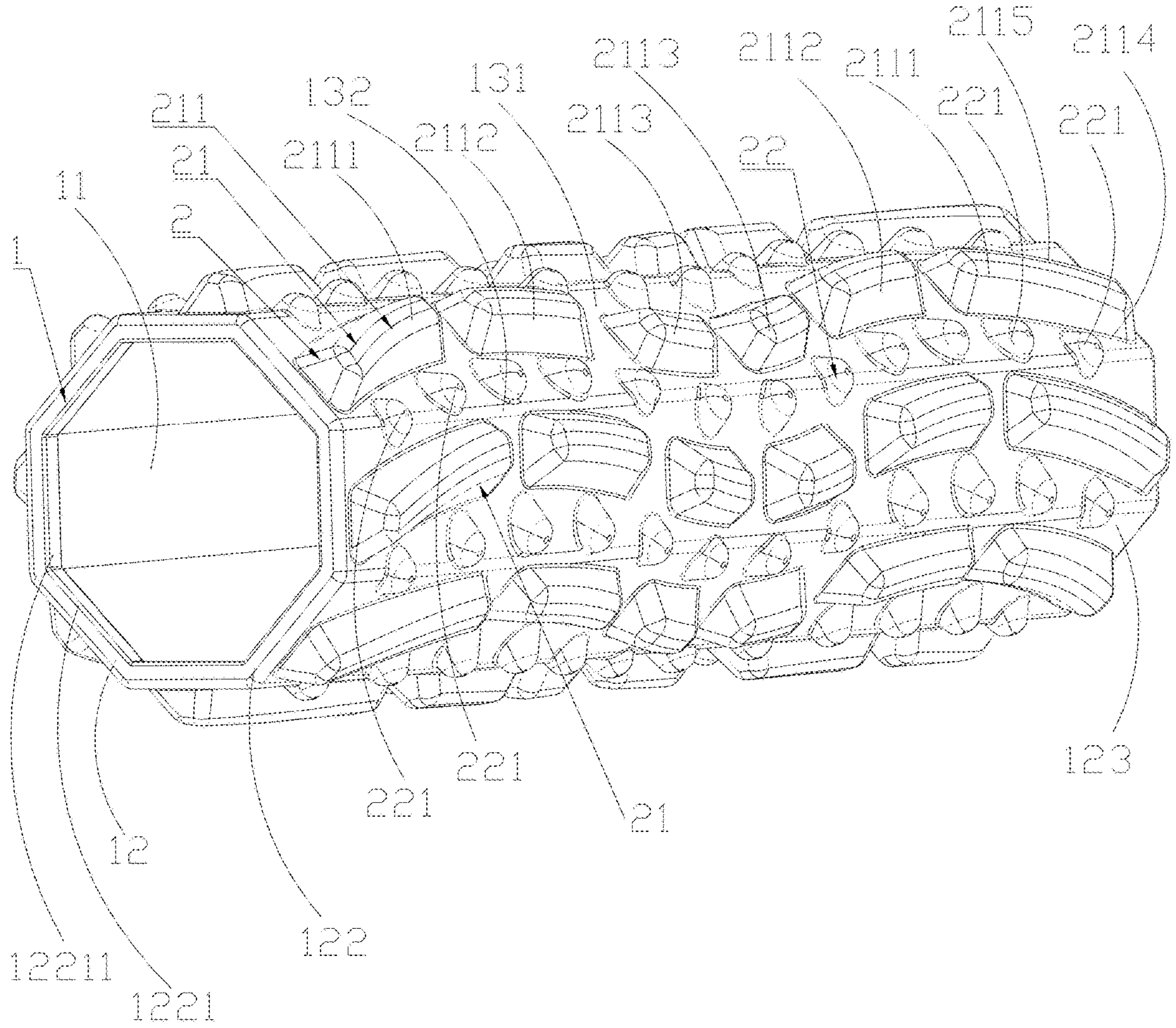
FIG. 1 is a perspective view of the present invention.
Figure 2:
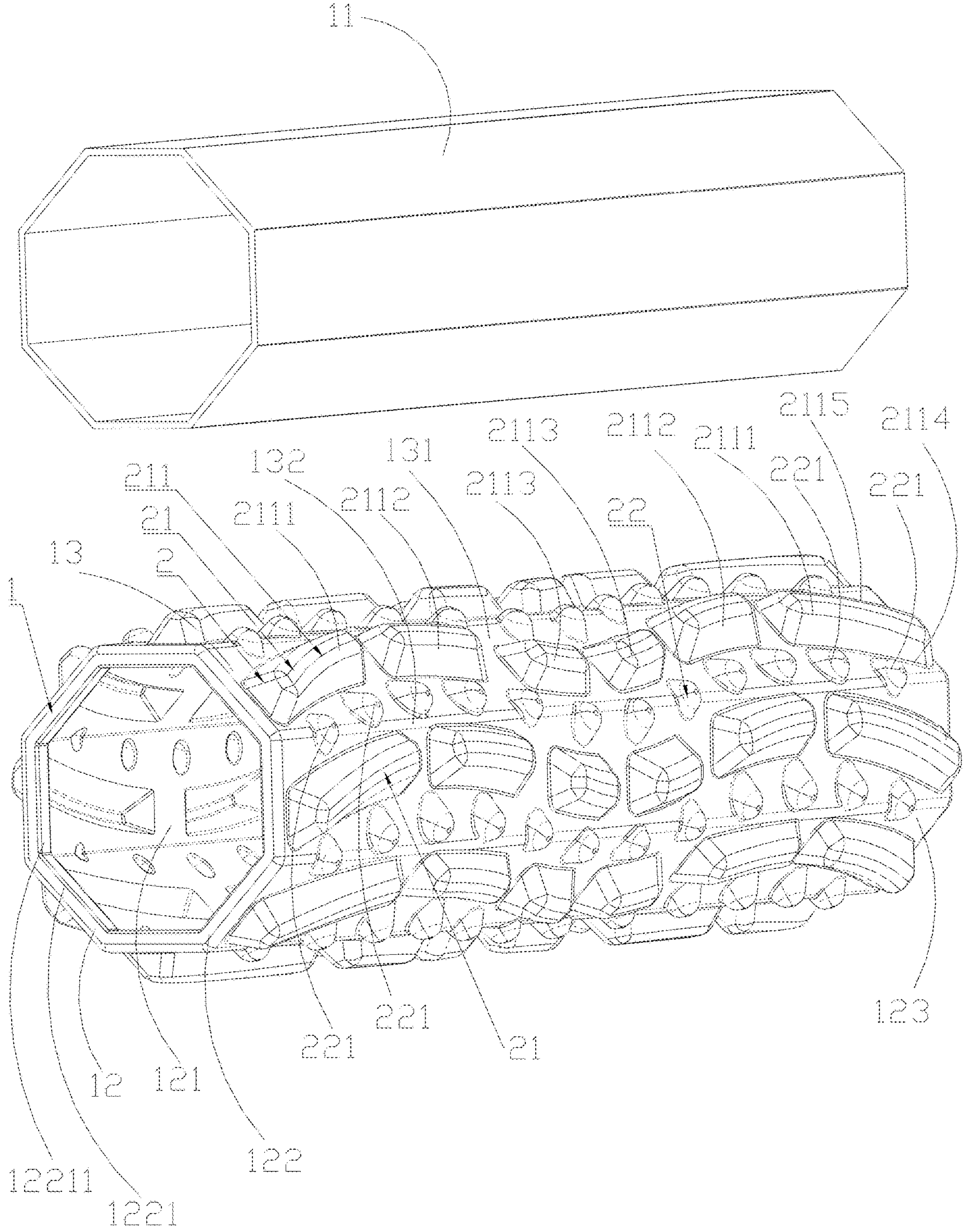
FIG. 2 is an exploded view of the present invention.
Figure 3:
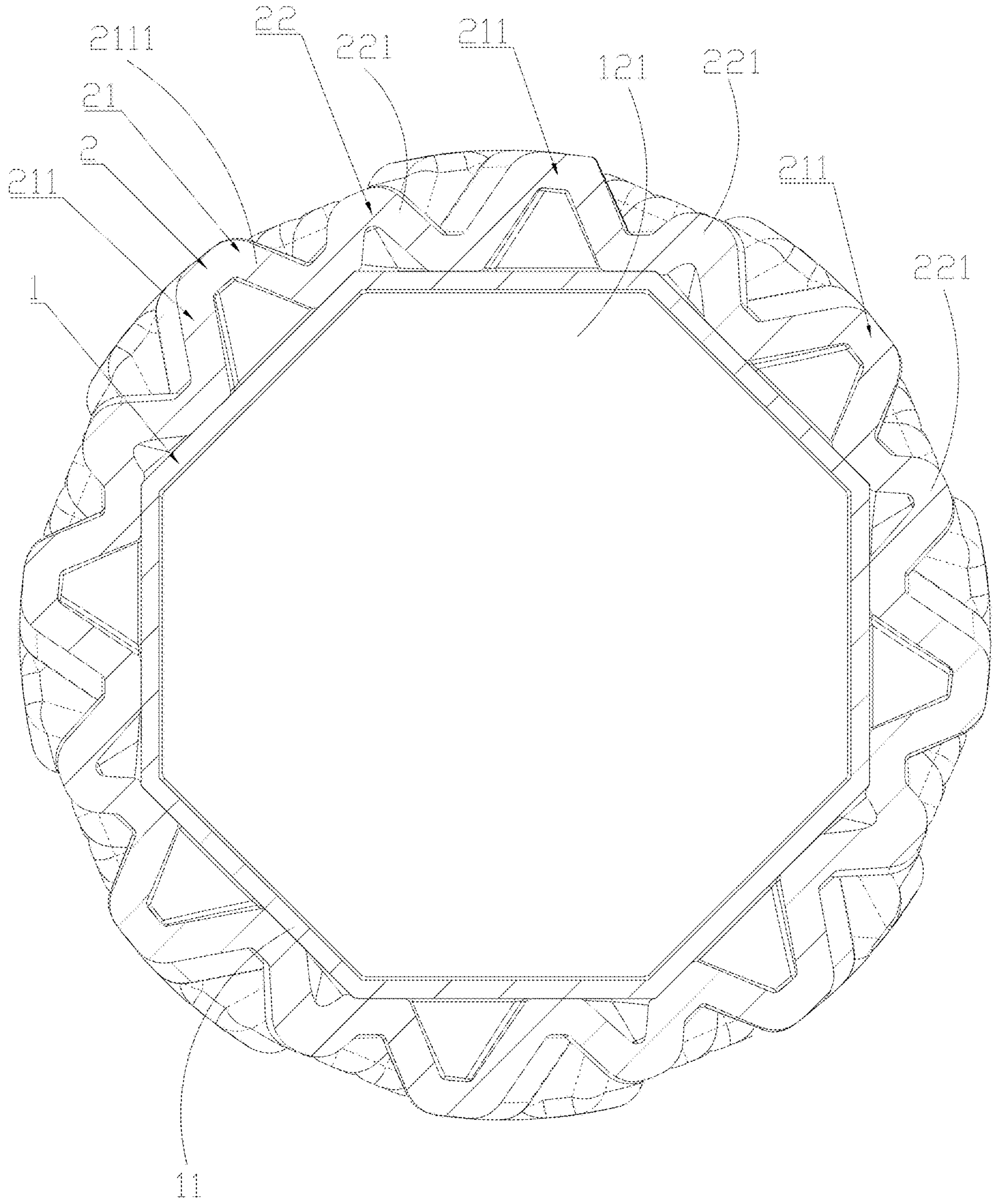
FIG. 3 is a sectional view taken along a first protruding part and a second protruding part.
Figure 4:
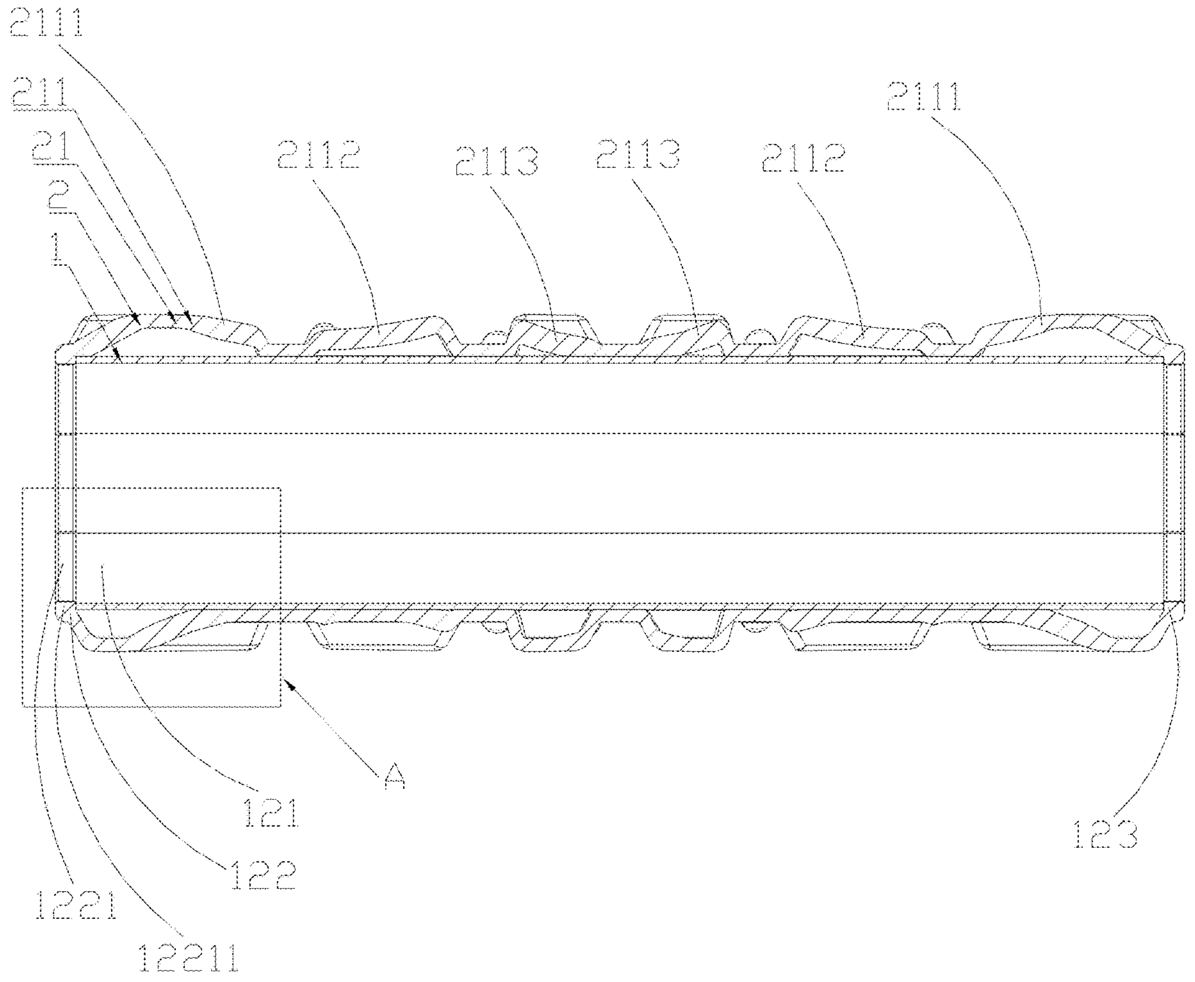
FIG. 4 is a sectional view taken along a first protruding part and a first stop edge.
Figure 5:
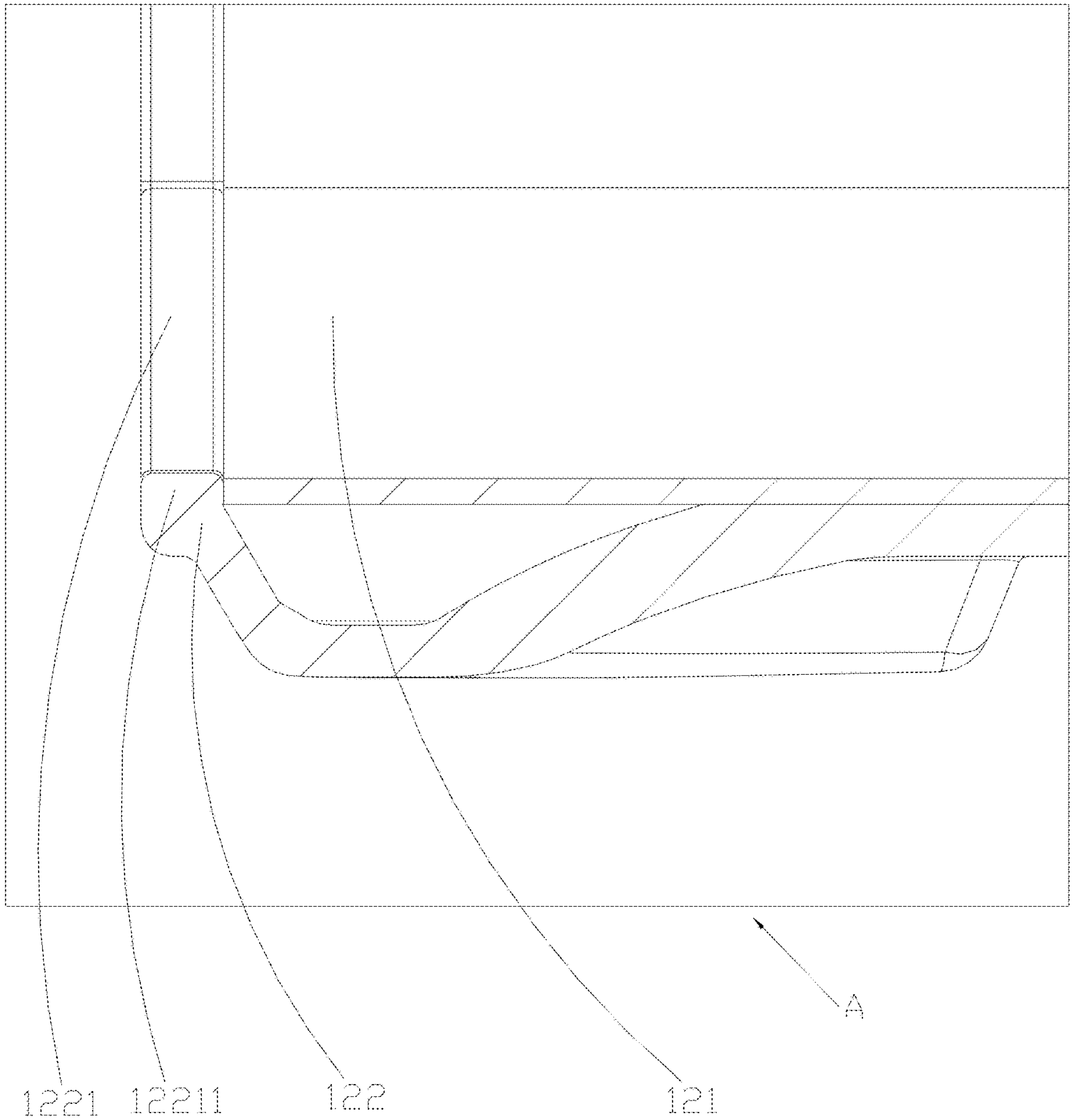
FIG. 5 is an enlarged view of area A in FIG. 4.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIGS. 1-8, a massage roller includes:

a polygonal main body 1; and a protruding massage part 2, wherein the protruding massage part 2 is connected to the polygonal main body 1, and the protruding massage part 2 is arranged around a circumference of the polygonal main body 1.

Through the above structure, the massage roller includes the polygonal main body 1 and the protruding massage part 2. The protruding massage part 2 is connected to the polygonal main body 1, and the protruding massage part 2 is arranged around the circumference of the polygonal main body 1. Since the protruding massage part 2 is arranged around the circumference of the polygonal main body 1, the polygonal main body 1 can continuously massage and relax a user's body parts while rolling. Moreover, since the main body is the polygonal main body 1, the rolling of the polygonal main body 1 is made more rhythmic and stable. Furthermore, since the main body is the polygonal main body 1, it is convenient for the user to calculate a total number of rolling to accurately massage various parts of the body, preventing excessive or insufficient massage on the body parts.

The protruding massage part is integrally formed and connected with the polygonal main body; alternatively, the protruding massage part is fixedly connected to the polygonal main body; alternatively, the protruding massage part is detachably connected to the polygonal main body.

Figure 6:
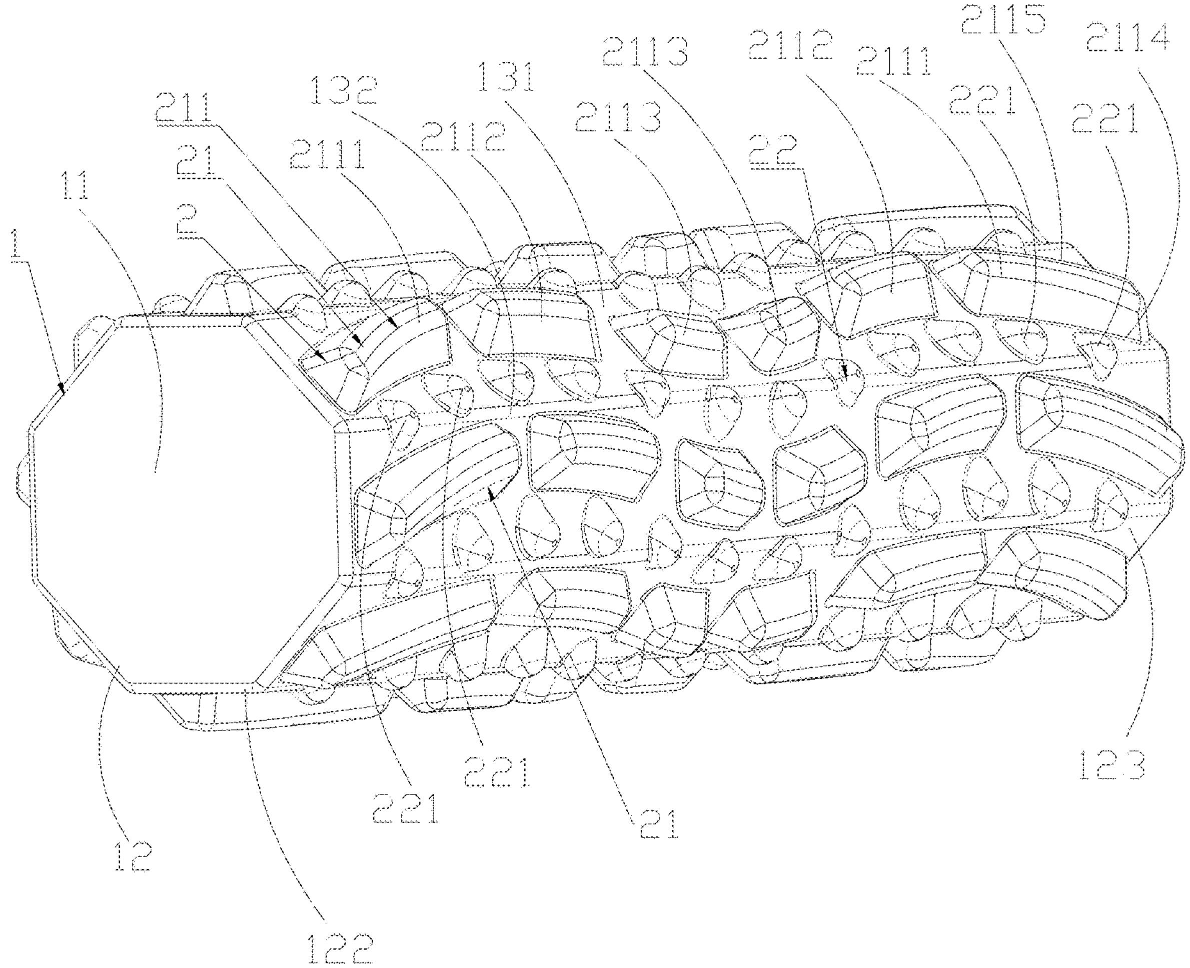
FIG. 6 is another perspective view of the present invention.
Figure 7:
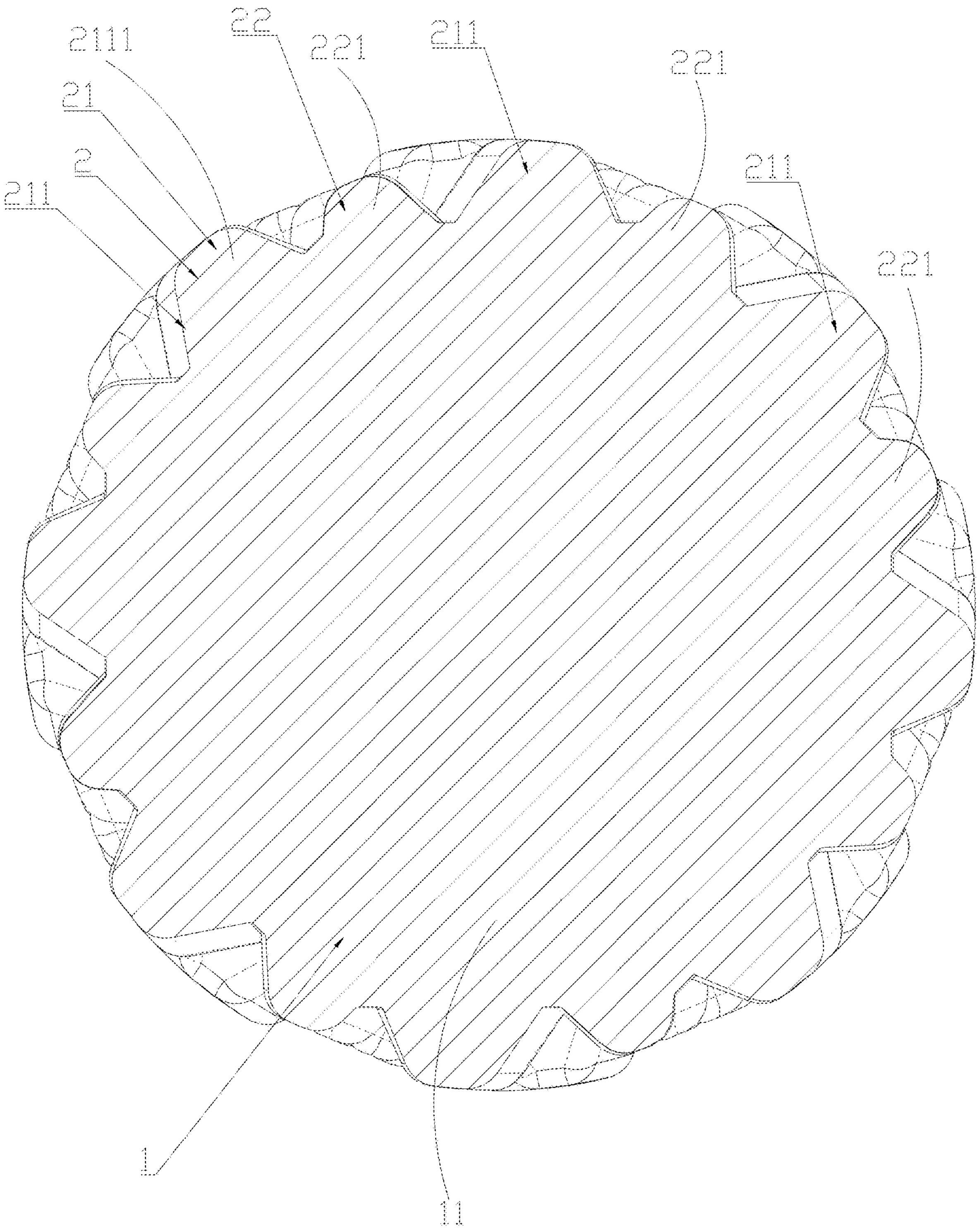
FIG. 7 is a sectional view taken along a first protruding part and a second protruding part.
Figure 8:
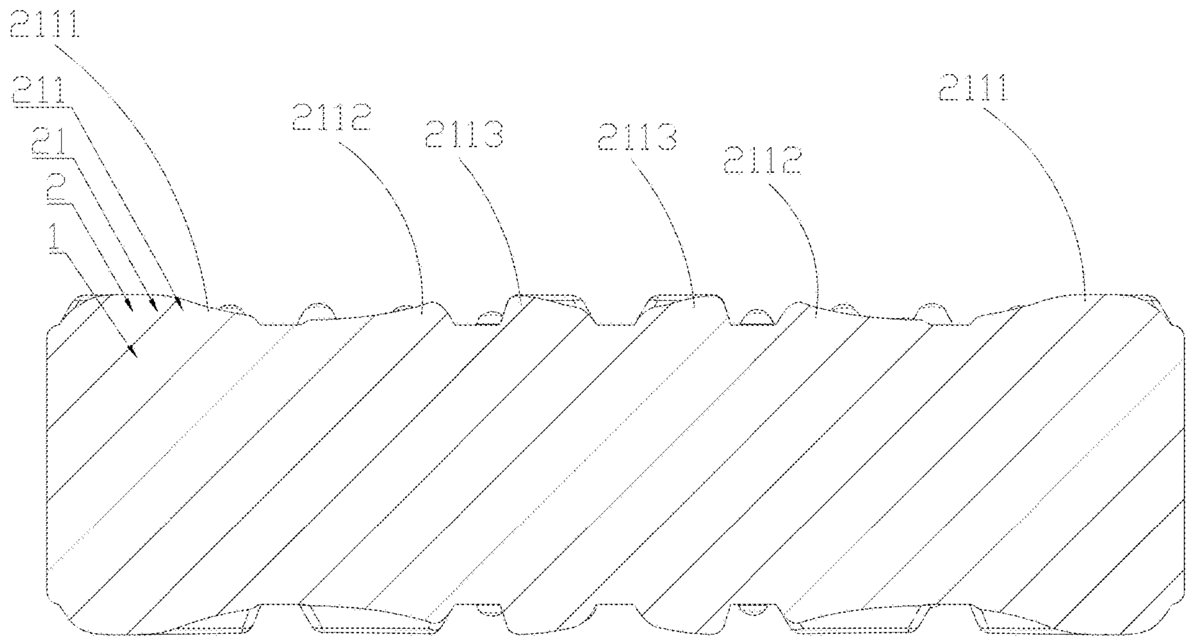
FIG. 8 is a sectional view taken along a first protruding part.

Referring to FIGS. 6-8, the polygonal main body 1 is a solid polygonal main body 1. Through the above structure, since the polygonal main body 1 is the solid polygonal main body 1, a support force of the massage roller is stronger, which can provide stronger massage force and prevent the polygonal main body from collapsing.

Referring to FIGS. 1-5, the polygonal main body 1 is a hollow polygonal main body 1. The polygonal main body 1 includes an inner core 11 and a cover layer 12. The cover layer 12 covers a surface of the inner core 11, and the protruding massage part 2 is connected to the cover layer 12. Specifically, the inner core 11 is a polygonal inner core 11, and the cover layer 12 is a polygonal cover layer 12. Furthermore, the inner core 11 and the cover layer 12 are made of different materials. Furthermore, the cover layer 12 is a flexible cover layer 12. Furthermore, a hardness of the cover layer 12 is less than a hardness of the inner core 11. Furthermore, the inner core 11 is a hollow inner core 11. Through the above structure, the flexible cover layer 12 can enhance a tactile sensation of the massage roller during use, making it more comfortable and gentle for the user to massage body parts with the massage roller. Moreover, the inner core 11 with a hardness greater than that of the cover layer 12 can effectively support the cover layer 12 to prevent the massage roller from collapsing. Furthermore, the hollow inner core 11 can save the molding material of the inner core 11, while reducing a self weight of the massage roller, making it easier to package and transport the massage roller. The inner core and the cover layer are integrally formed and connected; alternatively, the inner core is fixedly connected to the cover layer; alternatively, the inner core is detachably connected to the cover layer.

In this embodiment, the cover layer 12 is a denim cover layer 12, a coral fleece cover layer 12, a plastic cover layer 12, a silicone cover layer 12, or a rubber cover layer 12. The inner core 11 is a plastic inner core 11, a metal inner core 11, a bamboo inner core 11, or a wood inner core 11. Through the above structure, the denim cover layer 12, the coral fleece cover layer 12, the plastic cover layer 12, the silicone cover layer 12, or the rubber cover layer 12 has a soft texture, which can act more gently on the user's body parts. Moreover, the plastic inner core 11, the metal inner core 11, the bamboo inner core 11, or the wood inner core 11 has relatively high hardness and support force, which can effectively support the cover layer 12 to prevent the massage roller from collapsing. The protruding massage part is integrally formed and connected with the cover layer; alternatively, the protruding massage part is fixedly connected to the cover layer; alternatively, the protruding massage part is detachably connected to the cover layer.

In this embodiment, the cover layer 12 is provided with a cavity 121, a first end 122, and a second end 123. A first opening 1221 is defined in the first end 122. The first opening 1221 is in communication with the cavity 121. An inner wall of the first opening 1221 extends to form a protruding first stop edge 12211. The inner core 11 is positioned inside the cavity 121, and the first stop edge 12211 stops the inner core 11 inside the cavity 121. A height of the first stop edge 12211 is greater than or equal to a thickness of the inner core 11. Through the above structure, the connection between the inner core 11 and the cover layer 12 is effectively achieved, and the first stop edge 12211 can effectively confine the inner core 11 within the cavity 121, preventing a position of the inner core 11 from shifting.

In this embodiment, the protruding massage part 2 includes a plurality of first protruding parts 21 and a plurality of second protruding parts 22. A shape of the first protruding part 21 is different from a shape of the second protruding part 22. The first protruding parts 21 and the second protruding parts 22 are alternately arranged along the circumference of the polygonal main body 1. Through the above structure, since the shape of the first protruding part 21 is different from the shape of the second protruding part 22, the first protruding part 21 and the second protruding part 22 in different shapes can bring a multi-level massage experience to the user when the user uses the massage roller to massage.

In this embodiment, a height of the second protruding part 22 is less than a height of the first protruding part 21. A width of the second protruding part 22 is less than a width of the first protruding part 21. A length of the second protruding part 22 is less than a length of the first protruding part 21. Through the above structure, since the height of the second protruding part 22 is less than the height of the first protruding part 21, the first protruding part 21 and the second protruding part 22 at different heights can bring a multi-level and multi-depth massage experience to the body parts of the user when the user uses the massage roller to massage.

In this embodiment, the first protruding part 21 includes a plurality of first protruding blocks 211. The plurality of first protruding blocks 211 are distributed in a wave shape along an axial direction of the polygonal main body 1. The second protruding part 22 includes a plurality of second protruding blocks 221. The plurality of second protruding blocks 221 are distributed in a wave shape along the axial direction of the polygonal main body 1. Through the above structure, the arrangement of the first protruding block 211 and the second protruding block 221 is effectively achieved. Moreover, since the plurality of first protruding blocks 211 are distributed in a wave shape along the axial direction of the polygonal main body 1, and the plurality of second protruding blocks 221 are distributed in a wave shape along the axial direction of the polygonal main body 1, an identical part of the body of the user can feel different levels of pressing. For example, a waist area can simultaneously feel the point-to-point pressing of the first protruding block 211 and the second protruding block 221.

In this embodiment, the polygonal main body 1 includes a plurality of connecting side walls 13. The plurality of connecting side walls 13 are connected to each other. The plurality of connecting side walls 13 each have a flat first outer surface 131. Connections of the plurality of connecting side walls 13 are provided with connecting edges 132. The plurality of first protruding blocks 211 are arranged along the first outer surfaces 131. The plurality of second protruding blocks 221 are arranged along the connecting edges 132. The plurality of first protruding blocks 211 are distributed in a wave shape along the first outer surfaces 131, and the plurality of second protruding blocks 221 are distributed in a wave shape along the connecting edges 132. Specifically, an upper end of the first protruding block 211 is narrower than a lower end of the first protruding block 211, and an upper end of the second protruding block 221 is narrower than a lower end of the second protruding block 221. Through the above structure, the plurality of first protruding blocks 211 are arranged along the first outer surfaces 131, and the plurality of second protruding blocks 221 are arranged along the connecting edges 132, so that the first protruding blocks 211 and the second protruding blocks 221 can provide different strengths of pressing to the user's body parts. The second protruding blocks 221 arranged on the connecting edges 132 can provide greater strength of pressing to the user's body parts being pressed during rolling. Moreover, the upper end of the first protruding block 211 is narrower than the lower end of the first protruding block 211, and the upper end of the second protruding block 221 is narrower than the lower end of the second protruding block 221, so that when the narrower upper end of the first protruding block 211 and the narrower upper end of the second protruding block 221 make contact with the body part, the pressing area is reduced and the strength of pressing is increased, thereby bringing a deeper level of pressing to the body part. Specifically, a width of the first protruding block gradually decreases from bottom to top, and a width of the second protruding block gradually decreases from bottom to top. A length of the first protruding block gradually decreases from bottom to top, and a length of the second protruding block gradually decreases from bottom to top.

In this embodiment, the plurality of first protruding blocks 211 include first protruding block units 2111, second protruding block units 2112, and third protruding block units 2113. A length of the first protruding block unit 2111 is greater than a length of the second protruding block unit 2112, and the length of the second protruding block unit 2112 is greater than a length of the third protruding block unit 2113. The first protruding block 211 includes two of the first protruding block units 2111, and the two first protruding block units 2111 are symmetrically arranged with each other. The first protruding block 211 includes two of the second protruding block units 2112, and the two second protruding block units 2112 are symmetrically arranged with each other. The first protruding block 211 includes two of the third protruding block units 2113, and the two third protruding block units 2113 are symmetrically arranged with each other. Through the above structure, the arrangement of the plurality of first protruding blocks 211 is effectively achieved. Moreover, due to the length of the first protruding block unit 2111 being greater than the length the second protruding block unit 2112, and the length of the second protruding block unit 2112 being greater than the length the third protruding block unit 2113, the first protruding block unit 2111, the second protruding block unit 2112, and the third protruding block unit 2113 have different pressing areas, providing different pressing strengths and bringing different levels of massage experience to the body parts.

In this embodiment, the polygonal main body 1 is a triangular main body, a quadrilateral main body, a pentagonal main body, a hexagonal main body, a heptagonal main body, an octagonal main body, or a nonagonal main body. The polygonal main body can also be a polygonal main body 1 of other shapes. Through the above structure, the arrangement of the polygonal main body 1 is effectively achieved, and the protruding massage part 2 is arranged around a surface of the polygonal main body 1. By the layout of the protruding massage part 2, an outer circumference of the protruding massage part 2 surrounds and forms a roughly circular shape, so that the massage roller can roll and massage through the outer circumference of the protruding massage part 2.

In this embodiment, a length range of the polygonal main body 1 is 5 CM-200 CM, a length range of the protruding massage part 2 is 0.1 CM-100 CM, and a height range of the protruding massage part 2 is 0.1 CM-5 CM. A thickness range of the inner core 11 is 0.1 CM-100 CM, and a thickness range of the cover layer 12 is 0.1 CM-15 CM. Specifically, the length range of the polygonal main body 1 is 15 CM-100 CM, the length range of the protruding massage part 2 is 0.5 CM-45 CM, and the height range of the protruding massage part 2 is 0.5 CM-2 CM. Furthermore, the thickness range of the inner core 11 is 0.1 CM-6 CM, and the thickness range of the cover layer 12 is 0.3 CM-10 CM. Through the above structure, the size design is reasonable, the arrangement of the protruding massage part 2 and the polygonal main body 1 is effectively realized, and the actual usage needs of the user in different scenes can be met.

In this embodiment, a lower edge 2114 of the first protruding block 211 is an arc-shaped lower edge 2114, and an upper edge 2115 of the first protruding block 211 is an arc-shaped upper edge 2115. The first protruding block 211 is a long strip-shaped first protruding block 211. Specifically, the second protruding block 221 is a circular second protruding block 221. Furthermore, the first protruding block unit 2111, the second protruding block unit 2112, and the third protruding block unit 2113 have an identical width. Furthermore, the plurality of second protruding blocks 221 have an identical shape. Through the above structure, the lower edge 2114 of the first protruding block 211 is the arc-shaped lower edge 2114, and the upper edge 2115 of the first protruding block 211 is the arc-shaped upper edge 2115, so that the first protruding block 211 is in a twisted shape, and the first protruding block 211 extends from a lower side of the first outer surface 131 to an upper side of the first outer surface 131.

In this embodiment, the protruding massage part 2 covers at least 1/10 of a surface area of the polygonal main body 1. A ratio of a length of the polygonal main body 1 to a width of the polygonal main body 1 is at least 1.1:1. A ratio of the length of the polygonal main body 1 to a height of the polygonal main body 1 is at least 1.1:1. Specifically, the height of the polygonal main body 1 is greater than a height of the protruding massage part 2. Furthermore, a ratio of the height of the polygonal main body 1 to the height of the protruding massage part 2 is at least 1.1:1. Furthermore, a ratio of the height of the first protruding part 21 to the height of the second protruding part 22 is at least 1.1:1. Furthermore, a ratio of the length of the first protruding block 211 to the width of the first protruding block 211 is at least 1.1:1. Through the above structure, the design is reasonable, and the arrangement of the first protruding part 21 and the second protruding part 22 is effectively achieved, so that the first protruding part 21 and the second protruding part 22 can provide different pressing stimuli to the user's body parts, thereby making the pressing effect of the massage roller better.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A massage roller, comprising:

a polygonal main body; and a protruding massage part, wherein the protruding massage part is connected to the polygonal main body, and the protruding massage part is arranged around a circumference of the polygonal main body;

wherein the protruding massage part comprises a plurality of first protruding parts and a plurality of second protruding parts; a shape of each of the first protruding parts is different from a shape of each of the second protruding parts; and the first protruding parts and the second protruding parts are alternately arranged along the circumference of the polygonal main body;

the first protruding parts comprise a plurality of first protruding blocks; the plurality of first protruding blocks are distributed in a wave shape along an axial direction of the polygonal main body; the second protruding parts comprise a plurality of second protruding blocks; and the plurality of second protruding blocks are distributed in a wave shape along the axial direction of the polygonal main body; and wherein the plurality of first protruding blocks comprise two first protruding block units, two second protruding block units, and two third protruding block units; a length of each of the first protruding block units is greater than a length of each of the second protruding block units; the length of each of the second protruding block units is greater than a length of each of the third protruding block units; the two first protruding block units are symmetrically arranged with each other; the two second protruding block units are symmetrically arranged with each other; and the two third protruding block units are symmetrically arranged with each other.

2. The massage roller according to claim 1, wherein the polygonal main body is a solid polygonal main body.

3. The massage roller according to claim 1, wherein the polygonal main body is a hollow polygonal main body.

4. The massage roller according to claim 1, wherein the polygonal main body comprises an inner core and a cover layer; the cover layer covers a surface of the inner core; and the protruding massage part is connected to the cover layer.

5. The massage roller according to claim 4, wherein the inner core is a polygonal inner core; and the cover layer is a polygonal cover layer.

6. The massage roller according to claim 4, wherein the inner core and the cover layer are made of different materials.

7. The massage roller according to claim 4, wherein the cover layer is a flexible cover layer.

8. The massage roller according to claim 4, wherein a hardness of the cover layer is less than a hardness of the inner core.

9. The massage roller according to claim 4, wherein the cover layer is a denim cover layer, a coral fleece cover layer, a plastic cover layer, a silicone cover layer, or a rubber cover layer; and the inner core is a plastic inner core, a metal inner core, a bamboo inner core, or a wood inner core.

10. The massage roller according to claim 4, wherein the inner core is a hollow inner core.

11. The massage roller according to claim 4, wherein the cover layer is provided with a cavity, a first end, and a second end; the first end and the second end are each provided with a first opening; each first opening is in communication with the cavity; an inner wall of the first opening extends to form a protruding first stop edge; the inner core is positioned inside the cavity; and the first stop edge stops the inner core inside the cavity.

12. The massage roller according to claim 11, wherein a height of the first stop edge is greater than or equal to a thickness of the inner core.

13. The massage roller according to claim 1, wherein a height of each of the second protruding parts is less than a height of each of the first protruding parts; a width of each of the second protruding parts is less than a width of each of the first protruding parts; and a length of each of the second protruding parts is less than a length of each of the first protruding parts.

14. The massage roller according to claim 1, wherein the polygonal main body comprises a plurality of connecting side walls; the plurality of connecting side walls are connected to each other; the plurality of connecting side walls each have a flat first outer surface; connections of the plurality of connecting side walls are provided with connecting edges; the plurality of first protruding blocks are arranged along the first outer surfaces; and the plurality of second protruding blocks are arranged along the connecting edges.

15. The massage roller according to claim 1, wherein the polygonal main body is a triangular main body, a quadrilateral main body, a pentagonal main body, a hexagonal main body, a heptagonal main body, an octagonal main body, or a nonagonal main body.

16. The massage roller according to claim 1, wherein a length range of the polygonal main body is 5 CM-200 CM; a length range of the protruding massage part is 0.1 CM-100 CM; and a height range of the protruding massage part is 0.1 CM-15 CM.

17. The massage roller according to claim 4, wherein a thickness range of the inner core is 0.1 CM-100 CM; and a thickness range of the cover layer is 0.1 CM-15 CM.

18. A massage roller, comprising:

a polygonal main body; and a protruding massage part, wherein the protruding massage part is connected to the polygonal main body, and the protruding massage part is arranged around a circumference of the polygonal main body;

wherein the protruding massage part comprises a plurality of first protruding parts and a plurality of second protruding parts; a shape of each of the first protruding parts is different from a shape of each of the second protruding parts; and the first protruding parts and the second protruding parts are alternately arranged along the circumference of the polygonal main body;

the first protruding parts comprise a plurality of first protruding blocks; the plurality of first protruding blocks are distributed in a wave shape along an axial direction of the polygonal main body; the second protruding parts comprise a plurality of second protruding blocks; and the plurality of second protruding blocks are distributed in a wave shape along the axial direction of the polygonal main body;

wherein at least one of the first protruding blocks has a length greater than a double length of each of the second protruding blocks, adjacent two of first protruding blocks has a first space defined therebetween, and any one of second protruding blocks is not in the first space; and adjacent two of second protruding blocks has a second space defined therebetween, and any one of first protruding blocks is not in the second space.

* * * * *